Oct. 5, 1943.　　　　　C. E. SMITH　　　　　2,331,242
ELECTRIC VALVE CIRCUIT
Filed May 10, 1941
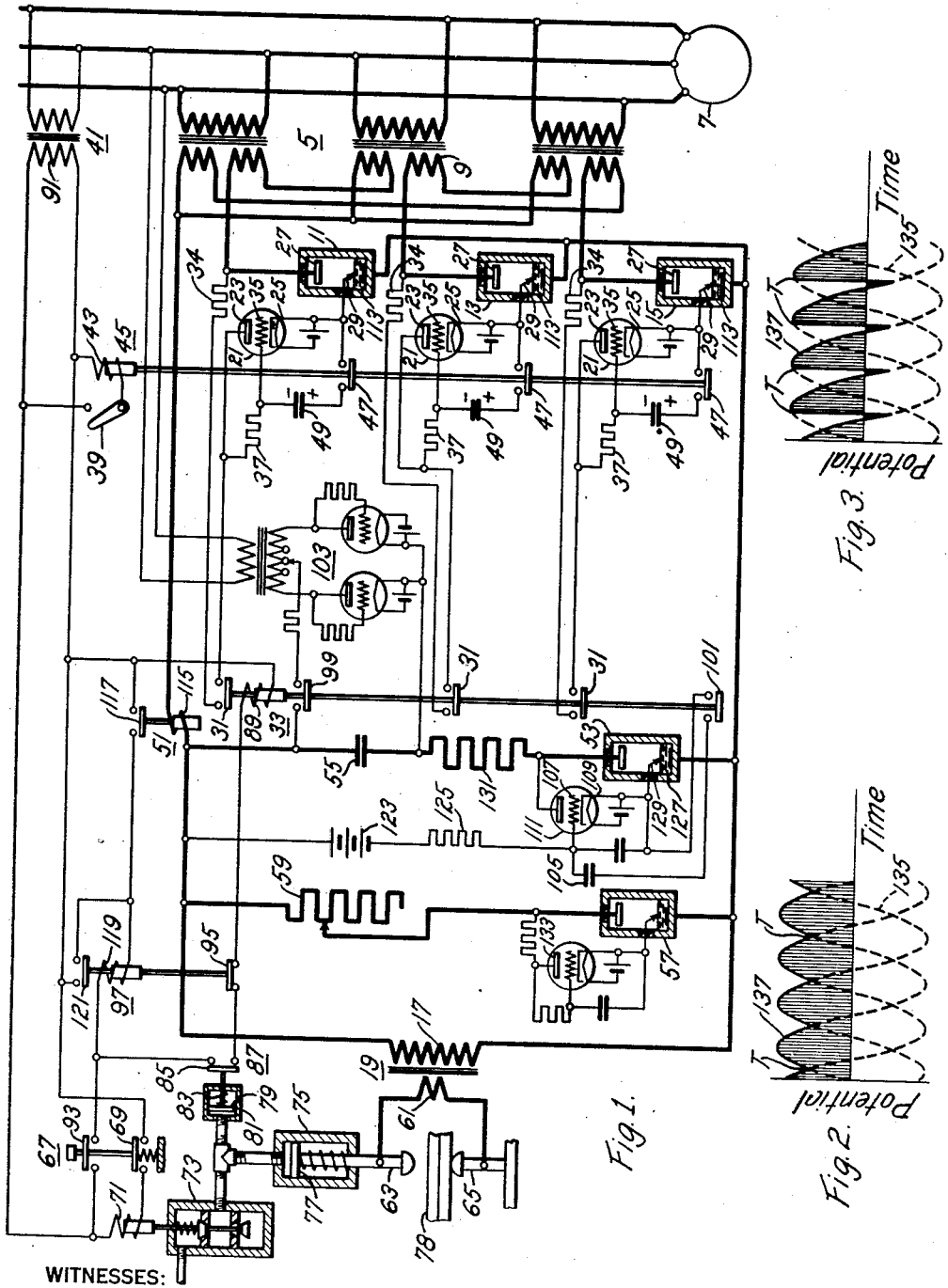
WITNESSES:
INVENTOR
Clyde E. Smith.
BY
ATTORNEY Patented Oct. 5, 1943

2,331,242

UNITED STATES PATENT OFFICE 2,331,242

ELECTRIC VALVE CIRCUIT

Clyde E. Smith, Wilkinsburg, Pa., assignor to Westinghouse Electric & Manufacturing Company, East Pittsburgh, Pa., a corporation of Pennsylvania Application May 10, 1941, Serial No. 392,869

6 Claims. (Cl. 250—27)

My invention relates to electric discharge valve circuits, and has particular relation to circuits employed for controlling the supply of energy to a load.

In using apparatus with electric discharge valves connected between a source of potential and a load, it becomes desirable for certain operations to alter the amount of energy supplied through the valves. The necessity for equipment of simple and inexpensive structure to effect the change is particularly urgent in cases in which valve circuits are used for supplying direct current to a load from a source of periodically pulsating potential; for example, in welding apparatus of the magnetic storage energy type such as is disclosed in the copending application of Donald P. Faulk, Serial No. 374,662, filed January 16, 1941, Patent No. 2,300,538, and assigned to the Westinghouse Electric & Manufacturing Company. In this case the electric discharge valve means is interposed between a source of periodically pulsating potential and the highly reactive primary of the welding transformer to impress a potential on the latter for supplying charging current therethrough. After the reactor is charged, the supply current is interrupted permitting the reactor to discharge. The decay in flux in the welding transformer as the reactor discharges, induces a potential in the secondary causing welding current to flow through the electrodes connected thereto.

The apparatus is used primarily in welding stainless steel or aluminum and in making other high quality welds, and the values are normally arranged to impress the maximum available potential on the welding transformer. However, in the welding of certain materials, such as thin gauge aluminum, it is necessary to decrease the potential impressed upon the welding transformer from the normal value to obtain uniformity in the quality of the weld. With a low impressed potential, the charging current rises slowly so that any slight delay in interruption does not effect the character of the weld of the thin sheets.

The necessary low potential is achieved in accordance with the teaching of the prior art of which I am aware by varying the supply transformer output. However, this expedient is often inconvenient and frequently involves comparatively expensive equipment.

It is accordingly an object of my invention to provide an electric discharge valve circuit including simple and inexpensive means for altering the amount of energy which is supplied through the valve means.

Another object of my invention is to provide an electric discharge valve rectifier with novel means for changing the value of the potential supplied therefrom at will.

A further object of my invention is to provide a novel electric discharge valve circuit for supplying a direct current to a load from a source of periodically pulsating potential in which the amount of energy supplied may be altered at will.

A more specific object of my invention is to provide a welding system of the magnetic storage energy type in which the magnitude of the welding current shall be precisely adaptable to the gauge of the material welded.

Another specific object of my invention is to provide a simple and tractable welding system of the magnetic storage energy type which shall have a plurality of distinct current settings for welding materials of different gauge.

My invention arises from the realization that only two settings are in practice necessary to render the welding apparatus suitable for welding materials over a wide range of thickness. One setting is used for thick materials and the other for thin materials.

In accordance with my invention, the energy supplied to a load or the welding material through electric discharge valve means is altered at will by a switching device which interposes a fixed time delay element in the control circuit of each supply valve or removes the element from the control circuit. The control circuit of each supply valve includes an auxiliary electric discharge device so connected that both the device and the associated supply valve are in condition to become conductive during the same potential pulsations. Control means are provided to establish a voltage between the control electrode and cathode of each auxiliary device of a valve such that the device is rendered conductive at a predetermined time during individual potential pulsations. Firing of the auxiliary device causes the associated valve to be rendered conductive. Since the electric discharge valve means is of the type that continues to conduct current throughout a potential pulsation once it has been rendered conductive, the amount of energy supplied, or the average potential impressed on, the load depends upon the time during that pulsation at which the auxiliary device becomes conductive.

When it is necessary to reduce the potential impressed upon the load, a time delay means is inserted in the control circuit of each supply valve. The time delay means may take the form of a capacitor connected at will across the control electrode and cathode of each auxiliary device. The capacitor has its negative plate connected to the control electrode and, therefore, its potential must be overcome before the necessary positive control electrode-cathode potential may be established to effect firing of the device. The time required to overcome the capacitor potential is determined by the dimensions of the capacitor with respect to other constants in the circuit. Thus firing of the device and consequently the time at which the supply valves are rendered conductive, is delayed until a later predetermined time. As a result, the average potential impressed on the load is reduced a predetermined amount.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1 is a diagrammatic view of a welding apparatus embodying my invention,

Fig. 2 is a graph illustrating the maximum available potential impressed on the load, and Fig. 3 is a graph illustrating the potential impressed on the load after the time delay means has been inserted in the control circuit.

The apparatus shown in Fig. 1 is similar to that disclosed and described in the aforementioned copending application of Donald P. Faulk. A supply transformer 5 is energized from a source of polyphase potential 7, the transformer secondary 9 being connected in zigzag. Electric discharge valves 11, 13 and 15 of the arc-like type, preferably ignitrons, are connected between the external terminals of the secondary 9 of the supply transformer 5 and the primary 17 of the welding transformer 19. Each of the supply ignitrons 11, 13 and 15 is provided with a control circuit including an auxiliary discharge device 21 which may be a thyratron with its anode 23 and cathode 25 connected to the anode 27 and igniter 29 of the corresponding ignitron through the contactor 31 of a control relay 33 and a current limiting resistor 34. A potential is established between the control electrode or grid 35 and the cathode 25 of each thyratron 21 by a circuit including a resistor 37 connected across the anode and grid of the thyratron. The control voltage thus provided reaches a positive value such that each thyratron is fired as its corresponding phase potential exceeds the other phase potentials. As each thyratron is fired, the corresponding supply ignitron is rendered conductive to impress its phase potential across the primary of the welding transformer for supplying charging current therethrough. With firing of each thyratron occurring as its phase potential exceeds the other phase potentials, the ignitrons are rendered conductive in succession and impress the maximum available potential across the primary.

A manually operated switch 39 is connected in circuit with an auxiliary source of potential 41 and the energizing coil 43 of an auxiliary relay 45. When a reduction in the impressed potential is desired, the switch 39 is closed energizing the auxiliary relay 45 whose contactors 47 close circuits connecting a capacitor 49 between the control electrode 35 and cathode 25 of each of the thyratrons 21 for controlling the supply ignitrons. During the negative half cycle of the corresponding phase potential, the capacitor 49 is charged with the plate connected to the control electrode 35 of the associated thyratron negative. The charging circuit of each capacitor 49 can be traced from one side of the secondary 9 of the supply transformer through the primary 17 of the welding transformer, the cathode 113 and igniter 29 of the corresponding ignitron, contactor 47, capacitor 49, grid resistor 37, contactor 31 and resistor 34 to the other side of the secondary 9. Then during the positive half cycle of the corresponding phase potential, firing of the corresponding thyratron is delayed because the charge on the capacitor 49 must be overcome and the capacitor charged in the opposite direction until the potential between grid 35 and the cathode 25 of the corresponding thyratron reaches a positive value to render the thyratron conductive. The extent of the delay in the firing of each thyratron depends therefore upon the dimensions of the capacitor 49 with respect to resistor 37. The capacitor is recharged in the original direction during the negative half cycle of the corresponding phase potential. With the capacitor 49 connected in the control circuits, each thyratron 21 is fired a predetermined time after its phase potential exceeds the other phase potentials. Consequently, the average potential impressed across the primary 17 is reduced a predetermined amount.

As the charging current flows through the primary 17 of the welding transformer 19, it gradually increases because of the high reactance of the primary. A current relay 51 is placed in series with the primary 17, and when the charging current reaches the desired value, the current relay 51 operates to effect deenergization of the control relay 33. The contactors 31 of the control relay open the anode circuits of each thyratron 21 to prevent firing thereof. One of the supply ignitrons is conductive when the anode circuits of the thyratrons are opened. The nonconductive ignitrons do not become conductive in succession thereafter, but the conductive ignitron continues to conduct current and the potential impressed on the primary decreases as the corresponding phase potential of the conductive ignitron decreases. The variation in the impressed potential causes firing of another electric discharge device 53 which is connected in series with a blocking capacitor 55. As the discharge device 53 which is preferably an ignitron, becomes conductive, the blocking capacitor 55 is connected across the conductive supply ignitron. The blocking capacitor is originally charged so that when connected across the conductive supply ignitron, it opposes the flow of current and renders the supply ignitron non-conductive.

The supply current is thus interrupted and the primary 17 of the welding transformer is permitted to discharge through a shunting ignitron 57 and a variable resistor 59 connected in series therewith. The shunting ignitron 57 is rendered conductive by a control circuit responsive to the potential across the primary 17 shortly after the supply current is interrupted. The decay in flux in the welding transformer causes welding current to flow through the secondary 61 and the welding electrodes 63 and 65 connected therewith.

With the apparatus in the condition shown in Fig. 1, a welding operation may be initiated by closing a manual controller such as a foot switch 67. The lower movable contactor 69 of the controller 67 closes completing a circuit through the energizing coil 71 of a fluid pressure valve 73. The valve operates permitting a fluid under pressure to flow into a piston chamber 75 and to move a piston 77. The piston 77 carries a movable welding electrode 63 and when it is actuated, the movable electrode is urged into engagement with the material 78 to be welded which, in turn, is held in engagement with the fixed welding electrode 65. The fluid continues to flow increasing the pressure on the piston 77 and exerting pressure on another piston 79 in an auxiliary chamber 81 in communication with the electrode piston chamber 75. The latter piston moves against the action of a spring 83 and closes the movable contactor 85 of a pressure switch 87 when the pressure on the movable welding electrode has reached the desired magnitude.

The exciting coil 89 of the control relay 33 is now energized in a circuit extending from an upper terminal of the secondary 91 of the auxiliary source transformer 41 through the manual controller, contactor 93, the pressure switch 87, the normally closed contactor 95 of a second auxiliary relay 97, the exciting coil 89 of the control relay 33 to the lower terminal of the secondary 91. The control relay is thus energized and its contactors 31 close the anode circuits of the thyratrons 21 controlling the supply ignitrons. Control relay 33 has two additional contactors 99 and 101. Contactor 99 closes a circuit in a full wave rectifier 103 for charging the blocking capacitor 55 and contactor 101 places a capacitor 105 across the grid 107 and cathode 109 of a thyratron 111 which controls firing of the ignitron 53 in series with the blocking capacitor 55.

As the phase potential applied to each of the firing thyratrons 21 for the supply ignitrons 11 through 15 exceeds the other phase potentials, the thyratron is rendered conductive. Firing current for the corresponding ignitron then flows from a terminal of the supply transformer secondary 9 through contacts 31, the thyratron 21, the igniter 29 and the cathode 113 of the ignitron, the primary 17 of the welding transformer 19 to the other terminal of the secondary 9. The supply ignitrons are thus rendered conductive in succession and charging current flows through the primary of the welding transformer and the exciting coil 115 of the current relay 51. When the charging current reaches a predetermined value, the current relay is energized and its contactor 117 closes.

A circuit is now completed which extends from the upper terminal of the secondary 91 of the auxiliary transformer 41 through contactor 93 of the manual controller 67, the exciting coil 119 of the auxiliary relay 97, the contactor 117 of the current relay 51 to the lower terminal of the secondary 91. The auxiliary relay 97 closes its contactor 121 to establish a holding circuit therefor and opens its normally closed contactor 95 breaking the circuit through the exciting coil of the control relay 33. As a result, the charging circuit of the blocking capacitor 55 is broken, the capacitor 105 is disconnected from the grid and cathode of the thyratron 111 controlling the conductivity of the ignitron 53 in series with the blocking capacitor 55, and the anode circuits of the firing thyratrons 21 for the supply ignitrons are opened.

As the operation progresses, the non-conductive ignitrons 11 through 15 do not become conductive in their turn because their firing thyratrons 21 are non-conductive. The conductive ignitron continues to carry current as the potential of the phase from which it is supplied decreases, by reason of the reactive impedance in its anode-cathode circuit. As the phase potential decreases, the potential across the primary of the welding transformer correspondingly increases from its negative value and eventually the net potential attains such a value that it counteracts a biasing potential 123 in the control circuit of the thyratron 111 associated with the ignitron 53 in series with the blocking capacitor 55. The control circuit for the thyratron 111 extends from its control electrode 107 through a grid resistor 125 to the biasing potential 123, thence through the parallel network consisting of a primary 17 of the welding transformer on one side and the windings of the supply secondary 9 on the other side, and finally through the cathode 127 and igniter 129 of the ignitron 53 to the cathode 109 of the thyratron 111. When the bias potential 123 is counteracted and the critical potential of the thyratron 111 exceeded, the thyratron is fired to render the ignitron 53 conductive. The blocking capacitor 55 is connected across the supply ignitrons through a resistor 131 and forcibly deionizes the conductive ignitron.

The purpose of the capacitor 105 connected across the grid and cathode of the firing thyratron 111 for the ignitron connected in series with the blocking capacitor 55 is to prevent the blocking capacitor from being connected across the supply ignitrons before the charging current reaches its desired value. While the capacitor 105 is so connected, it is charged with its negative plate connected to the grid of the thyratron 111 by the supply voltage impressed across the circuit extending through the cathode 127 of the ignitron 53, the contactor 101 of the control relay 33, the capacitor 105, the resistor 125 and bias potential 123. If for any reason the biasing potential 123 is counteracted before the predetermined supply current value is reached, the thyratron 111 is not rendered conductive. Instead the voltage is used to charge the capacitor 105 in the opposite direction. The size of the capacitor 105 is such that the time required to charge it from its negative value to a positive value by the potential available, is greater than the time necessary for the phase potential to continue its cycle and return to its former condition in which the biasing potential is not counteracted. It is to be noted that when the firing of the supply ignitrons is delayed, whether deliberately to reduce the impressed potential or accidentally, the phase potential may decrease to a value equal to that used to effect firing of the thyratron 111 and an interruption of the supply of current. However, the interruption is prevented by the capacitor 105 in the control circuit of the thyratron. It is, therefore, necessary to disconnect the capacitor 105 from the control circuit before an interruption can take place.

As the blocking capacitor 55 interrupts the charging current, the rising reactor potential is impressed across the principal electrodes of the shunting ignitron 57 and the firing thyratron 133 therefor. The shunting ignitron 57 is rendered conductive and the reactor 17 discharges through the shunting ignitron and a variable resistor 59 connected in series therewith. The decay in flux in the welding transformer 19 as the reactor 17 discharges induces welding current in the secondary 61 and the material 78 is welded.

The operation may be repeated by releasing the manual controller 67 and reclosing it. When the controller is released, the holding circuit for the auxiliary relay 97 opens resetting the apparatus.

In Fig. 2 is shown a series of curves 135 with potential plotted vertically and time horizontally. The curves are sine waves partially broken and partially in full line representing the phase potentials supplied from the secondary 9 of the supply transformer 5. As each phase potential exceeds the other phase potentials, as represented by the point T, the associated supply ignitron is rendered conductive to impress the phase potential across the primary 17 of the welding transformer 19. The full line curve 137 made up of the top portions of the sine waves represents the potential impressed across the primary. As the average impressed potential is proportional to the area beneath the impressed potential curve, it is obvious that the maximum available potential is impressed on the welding transformer.

In Fig. 3 is shown a graph with potential plotted vertically and time horizontally in which the phase potentials are again represented by sine curves 135. However, this graph illustrates the potentials impressed on the welding transformer 19 when the time delay means is inserted in the control circuits of the supply ingnitrons. Consequently, as each phase potential exceeds the other phase potentials, the associated supply ignitron is not rendered conductive but its firing is delayed until some predetermined later time as represented by the point T. The full line curve 137 represents the potential impressed on the welding transformer. Comparison of the areas beneath the impressed potential curves of Figs. 2 and 3 discloses that the average potential impressed when the time delay means is inserted in the control circuits is reduced a predetermined amount.

In a system in accordance with my invention which has actually been constructed and tested, the supply ignitrons 11, 13 and 15 are Westinghouse WL-656 tubes and are energized from a source through a transformer 5 to impress a potential of 130 volts D. C. on the reactor 17. The firing thyratrons 21 for the supply ignitrons are Westinghouse WL-632 tubes and the resistors 34 in the anode circuits thereof are 2 ohms. The grid resistors 37 of the firing thyratrons 21 for the supply ignitrons are .5 megohm each. The capacitors 49 which are inserted across the grid and cathode of the firing thyratrons 21 for the supply ignitrons are each .005 microfarad and delay firing of the supply ignitrons to impress 88 volts on the welding transformer.

Although I have shown and described certain specific embodiments of my invention, I am fully aware that many modifications thereof are possible. My invention, therefore, is not to be restricted except insofar as is necessitated by the prior art and the spirit of the appended claims.

I claim as my invention:

1. For use in supplying a direct current to a load from a source of polyphase potential, the combination comprising electric discharge valve means connected between each phase of said source and said load to impress a potential on the latter to supply current therethrough, control means for each of said valve means including an auxiliary discharge device for controlling the conductivity of the corresponding valve means and having an anode, a cathode and a control electrode, said anode and cathode being connected to receive the corresponding phase potential thereacross, means for establishing a control potential between said control electrode and cathode of each device such that the device is rendered conductive at a first predetermined time during each period of the corresponding phase potential, a plurality of capacitors, and a single means for connecting one of said capacitors across the control electrode and cathode of each device to prevent said device from being rendered conductive until a second predetermined time during each period of the corresponding phase potential.

2. In combination, a source of periodic potential, an electric discharge device of the arc-like type having a plurality of principal electrodes in circuit with said source and a control electrode, said device being rendered conductive in a positive period of said source upon the establishment of a potential greater than a predetermined critical magnitude between said control electrode and one of said principal electrodes, means for impressing a periodic potential between said control electrode and one principal electrode which first rises above said critical magnitude at a first preselected instant in each positive period of said source, a capacitor, and means independent of said potential impressing means and operable at will for connecting said capacitor between said control electrode and one principal electrode to prevent said device from being rendered conductive until a second and later preselected instant in each positive period.

3. In combination, a source of potential, an electric discharge device of the arc-like type having a plurality of principal electrodes in circuit with said source and a control electrode, said device being rendered conductive upon the establishment between said control electrode and one of said principal electrodes of a potential greater than a predetermined critical magnitude, means for impressing a potential across said control electrode and said one principal electrode which first rises above said critical value at a preselected time, a capacitor, and means independent of said potential impressing means and including a switch operable at will for connecting said capacitor between said control electrode and said one principal electrode to prevent said device from being rendered conductive until a second preselected time later than said first time.

4. In combination, a source of alternating potential, an electric discharge device of the arc-like type having an anode and a cathode in circuit with said source and a control electrode, said device being rendered conductive in a positive half period of said source when the potential of said control electrode with respect to said cathode rises above a predetermined critical value, resistance means interconnecting said control electrode and said anode whereby the potential of said control electrode with respect to said cathode rises above said critical value at a preselected instant in each positive half period, a capacitor and means operable at will for connecting said capacitor between said control electrode and said cathode so that said capacitor and resistance means are in series across said anode and cathode to prevent the potential of said control electrode with respect to said cathode from rising above said critical value until a second and later preselected instant in each positive half period.

5. For use in supplying a direct current to a load from a source of polyphase potential, the combination comprising an electric discharge device for each phase of said source, each of said devices having a plurality of principal electrodes connected between the corresponding phase of the source and said load and a control electrode, each of said devices being rendered conductive upon the establishment of a potential between said control electrode and one of said principal electrodes which is greater than a predetermined critical value during a positive half period of the corresponding phase potential, means for impressing a potential between said control electrode and one principal electrode of each of said devices which first rises above said critical value at a first preselected instant in the positive half period of the corresponding phase potential, a capacitor for each of said devices, and a single means operable at will for connecting said capacitors between the control electrode and said one principal electrode of the corresponding device whereby to prevent said devices from being rendered conductive until a second and later preselected instant in each positive half period of the corresponding phase potential.

6. For use in supplying a direct current to a load from a source of polyphase potential, the combination comprising an electric discharge device for each phase of said source, each of said devices having an anode and cathode connected between the corresponding phase of the source and said load and a control electrode, resistance means interconnecting the control electrode and the anode of each of said devices, a capacitor for each of said devices, and a single means operable at will for connecting said capacitors between the control electrode and the cathode of the corresponding devices whereby the amount of energy supplied to the load may be changed at will.

CLYDE E. SMITH.